United States Patent [19]

Jensen et al.

[11] Patent Number: 4,735,642
[45] Date of Patent: * Apr. 5, 1988

[54] HOLLOW GLASS FIBER BUSHING ASSEMBLY

[75] Inventors: Thomas H. Jensen, Murrysville; Eugene J. Palamara; William L. Schaefer, both of Butler, all of Pa.

[73] Assignee: PPG Industries, Inc., Pittsburgh, Pa.

[*] Notice: The portion of the term of this patent subsequent to Oct. 6, 2004 has been disclaimed.

[21] Appl. No.: 914,436

[22] Filed: Oct. 2, 1986

Related U.S. Application Data

[63] Continuation-in-part of Ser. No. 811,226, Oct. 20, 1985, abandoned.

[51] Int. Cl.$^4$ .......................................... C03B 37/022
[52] U.S. Cl. ................................................ 65/1; 65/2; 65/86; 425/133.1; 425/DIG. 217
[58] Field of Search .................. 65/1, 2, 5, 86, 121; 425/133.1, 462, DIG. 217

[56] References Cited

U.S. PATENT DOCUMENTS

| | | | |
|---|---|---|---|
| 3,257,183 | 6/1966 | Slayter et al. | 65/6 |
| 3,268,313 | 8/1966 | Burgman et al. | 65/5 |
| 3,421,873 | 1/1969 | Burgman et al. | 65/1 |
| 3,510,393 | 5/1970 | Burgman et al. | 65/3 X |
| 3,526,571 | 9/1970 | Ogata | 425/DIG. 217 |

FOREIGN PATENT DOCUMENTS 381582  6/1931  United Kingdom ................. 65/3.1

*Primary Examiner*—Robert L. Lindsay
*Attorney, Agent, or Firm*—John E. Curley

[57] ABSTRACT

A fiber glass bushing is described which produces hollow glass fibers from a multiplicity of tips having air tubes centered inside of them. Modules for providing a common header for rows of tubes centered in rows of tips on the bushing bottom are shown along with means to maintain the tubes centered during the running of the bushing.

19 Claims, 2 Drawing Sheets

HOLLOW GLASS FIBER BUSHING ASSEMBLY

This application is a continuation-in-part of U.S. Pat. No. 811,226 filed 10/20/85, now abandoned.

The present invention relates to hollow glass fiber bushings. More particularly, the present invention relates to glass fiber bushings used to produce multiple hollow glass fibers simultaneously and maintain a uniform K value in the fiber produced. Still more particularly, the present invention relates to hollow glass fiber bushings which are capable of providing hundreds of hollow glass fibers having a desired K value while ensuring that the bushing maintains those values over the life of the bushing.

BACKGROUND OF THE INVENTION

In U.S. Pat. No. 3,510,393 assigned to the assignee of the instant application, a hollow glass fiber strand article is described. The hollow glass fibers of the claimed strands typified in this patent are fibers having outside diameters of 0.0003 to 0.003 inches and having 10 to 65 percent of their volume hollow. The hollow glass fibers described in the aforementioned patent found use as a resin reinforcement in filament wound applications such as radar domes, and may be used as a resin reinforcement for motor cases, storage tanks and the like. The advantage of the hollow glass fibers was to provide a significant improvement in the strength to weight ratio of reinforcing fibers utilized to reinforce resin fiber composites. Also provided, as stated in the aforementioned patent, was a significant reduction in the dielectric constant of materials reinforced with the hollow glass fibers over those reinforced with solid fibers. In U.S. Pat. No. 3,268,313, apparatus suitable for use in manufacturing the hollow glass fibers of the aforementioned U.S. Pat. No. 3,510,393 patent is shown. Similarly, in U.S. Pat. No. 3,421,873, alternative apparatus and methods are described where fibers can be produced which have intermittent hollowness provided along their length.

While the aforementioned apparatus, methods and fibers have found some utility in the marketplace their use has been limited due to several factors. One factor was the high cost of preparing the hollow glass fibers. This cost was high due to the fact that the apparatus was difficult to operate on a continuous basis without many process interruptions occurring during the formation of the fibers. The manufacturing costs consequently required high selling prices which was a deterrent in the marketplace. Further, the hollow fibers containing strands produced by the processes and apparatus described in these patents while containing a substantial number of hollow fibers when initially produced from commercial bushings were found after a period of time to contain significant numbers of solid fibers as well as the hollow glass fibers. Still further, the hollow glass fibers produced in a multiple fiber strand had little or no uniformity with respect to the concentricity of the central lumen of the fibers. Stated another way, the K value of the fibers, i.e., the ratio of the inside diameter of the lumen to the outside diameter of the fibers was found to be very erratic and subject to wide variations in a given strand of fibers.

Thus, despite the prior art a need still exists for processes and apparatus for producing hollow glass fibers of more uniform configuration. Still further a need exists for hollow glass fiber strands containing hollow filaments or fibers therein which possess more uniform ratios of inside to outside internal diameters and better concentricity of the central lumen of the fibers and for apparatus for producing such fibers.

In accordance with the instant invention improved hollow glass fibers are provided by using the Applicants' improved bushing assembly. The bushing of the instant invention is characterized by providing a central lumen in each of the fibers it produces having good concentricity and a more uniform K value than fibers heretofore produced. The fibers produced also have a more uniform strength to weight ratio than those previously made by prior art bushings.

SUMMARY OF THE INVENTION

It is an object of the instant invention to provide an improved hollow glass fiber bushing.

It is another object of the invention to provide a fiber glass bushing capable of producing multiple fibers of hollow configuration.

A still further object of the invention is to provide a hollow glass fiber bushing capable of producing hollow glass fibers having improved K values over those heretofore obtained.

A still further object of the present invention is to provide a hollow glass fiber bushing having an improved gas distribution system.

A further object of the invention is to provide hollow glass fiber bushings which can produce hundreds of hollow filaments of consistent quality simultaneously.

A still further object of the present invention is to provide a hollow glass fiber bushing that will withstand continuous operation while producing consistent quality uniform strand products.

A still further object of the present invention is to provide a bushing assembly that maintains each bushing orifice or tip in a fixed relationship to a gas distribution tube over the bushing life.

The invention further involves using a bushing having a plurality of bushing tips arranged in rows. The molten glass from the bushing passes through the rows of tips in a plurality of glass streams from which the filaments are formed. Each tip has a concentric gas tube centered in it which introduces gas to the molten glass leaving the tip. In the preferred embodiment, the glass exit and the gas exit are in the same horizontal plane and thus both the gas and the glass leave the bushing tip simultaneously to thereby form the glass into a hollow fiber. Unitary plate-like brackets are used to maintain the gas tubes centered in the tips and the plate-like brackets are spaced from but anchored to the bushing bottom at anchor sites located adjacent to each exit orifice associated with each tip. In the preferred embodiment, the anchors are formed by metal legs depending from the plate-like brackets that have their ends fused into the bushing bottom and each bracket is used to accommodate a plurality of gas tubes thereon.

These and other objects of the invention will become apparent to those skilled in the art from the ensuing description of the invention.

BRIEF DESCRIPTION OF THE DRAWINGS

For a more complete understanding of the present invention, reference is made to the accompanying drawings in which.

DETAILED DESCRIPTION OF THE DRAWINGS

In the accompanying drawings, FIGS. 1-7 show the fiber glass bushing of the instant invention which is utilized to provide novel hollow fiber glass strands. The bushing and its parts as shown in FIGS. 1-7 form the preferred embodiment of the instant invention.

Figure 5:
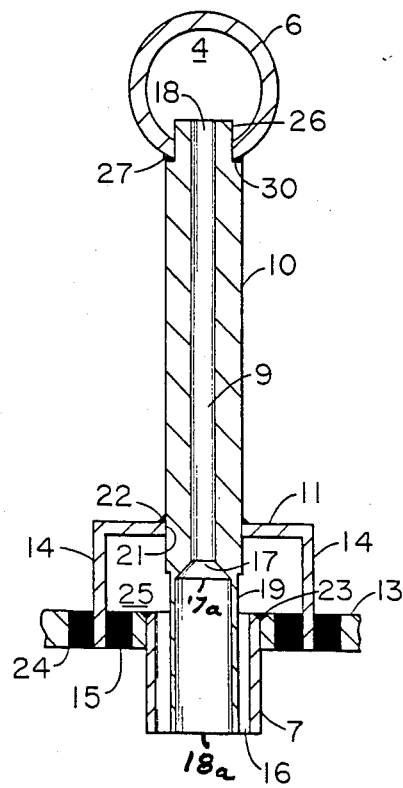
FIG. 5 is a side elevation in section of the bushing of FIG. 4 taken along line 5—5 and showing its support bracket and gas introduction tube.

Turning now to the drawings, and in particular to FIG. 5, there is shown in side elevation, a single bushing tip 7 and its associated gas distribution system. Bushing tip 7 is positioned in the tip plate, faceplate, or bottom 13 (hereinafter called tip plate) of bushing 1. Tip 7 is typically welded to the bottom 13 by a weld 23. Located inside of and concentric with tip 7 is tube 19, the outside wall of which with the interior wall of tip 7, forms an annulus 16. Annulus 16 provides a molten glass passage from glass reservoir 25 to the exterior of tip 7. Tube 19 is internally counterbored to provide a flared expansion 17 of conduit 9 formed by a gas introduction tube 10. The conduit 9 has an inlet 18 communicating with chamber 4 of header 6 and an exit 18a which has a diameter equal to the internal diameter of the lower section 17a of tube 10. Tube 10 is provided with a shoulder 30 and associated neck 26 which are welded at weld 27 to a gas header tube 6, thereby forming an airtight seal between header tube 6 and tube 10 and rigidly affixing tube 10 to header 6 and bracket 11 and tip plate 13.

Bracket 11 is preferably a flat metal plate having a drilled hole 21 therethrough in which tube 10 is inserted and held in firm engagement by weld 22 on the tube 10 and hole 21. Bracket 11 is a plate like member which is bent downwardly along the fold lines shown in FIG. 6 to provide side support to the surface in which tubes 10 are mounted. Bracket 11 is also provided with tab members 14 bent downwardly, preferably forming a right angle to the tip plate 13, when inserted into holes 24 in the bushing tip plate 13. After insertion in tip plate 13, the tabs 14 are heated by welding and the molten metal from tabs 14 forms a seal or anchor 15 in the tip plate 13, i.e., they become part of the tip plate itself. The individual unit shown in FIG. 5 is part of a multiplicity of tips and tubes utilized to produce the multiplicity of glass fibers that are produced utilizing the bushing of FIG. 1, as will be apparent in discussing the remaining drawing figures.

Figure 1:
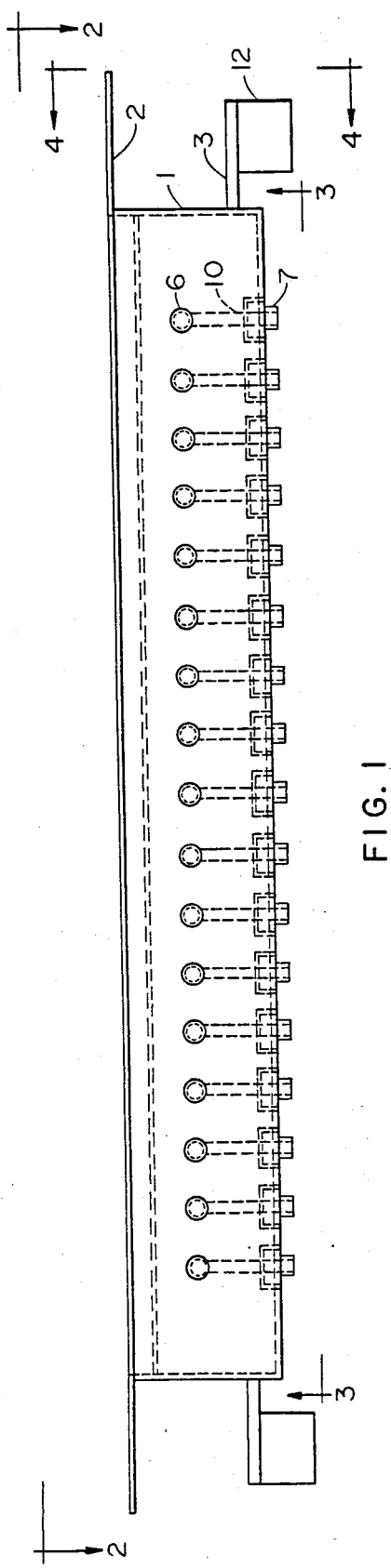
FIG. 1 is a side elevation of the bushing of the instant invention.
Figure 2:
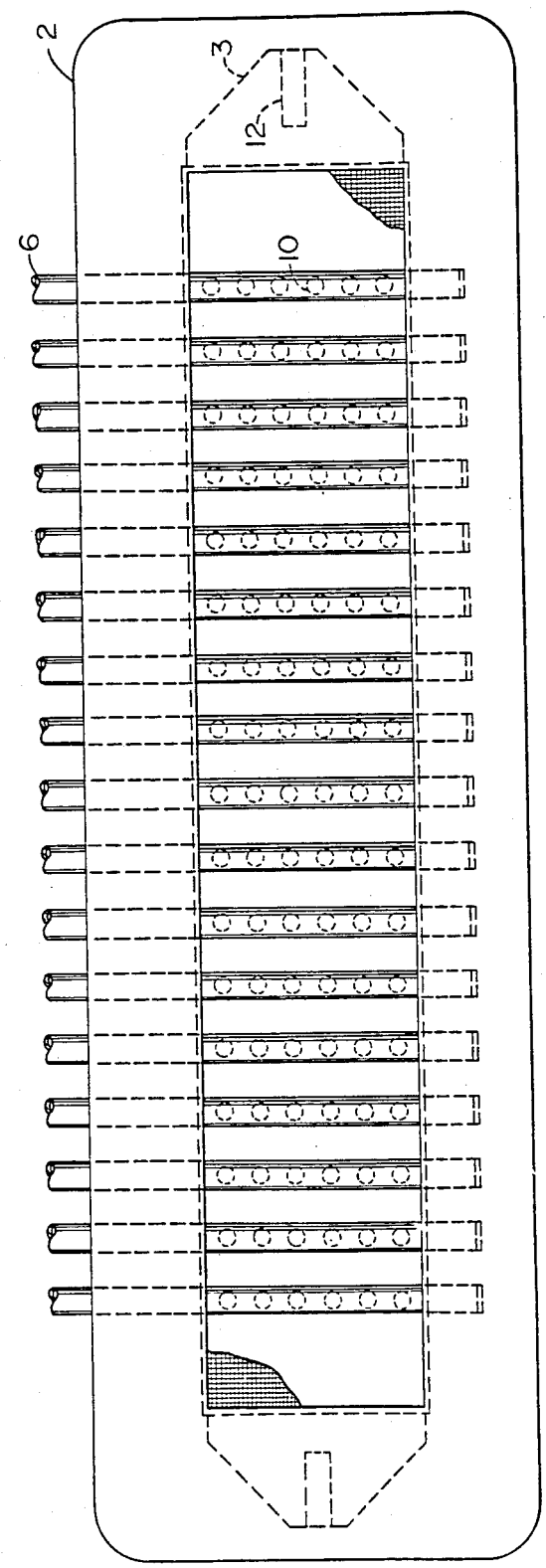
FIG. 2 is a plan view of the bushing of the instant invention taken at lines 2—2 of FIG. 1 and showing the bushing faceplate and the air manifolds and tip arrangement.

Turning now to FIGS. 1 and 2 there is shown therein a bushing 1, having a peripheral flange 2 which extends around the bushing 1. A plurality of headers 6 are shown which feed a multiplicity of gas tubes 10 associated with bushing tips 7. In the preferred embodiment of the instant invention, seventeen (17) headers and their seventeen (17) associated gas conduits 10 are employed to feed a plurality of bushing tips 7. Each of the the 17 gas headers 6, shown in FIG. 1 are utilized to feed a multiplicity of gas conduits 10. Thus as shown in FIG. 2, each gas header 6, feeds six individual gas tubes 10. Each gas tube 10, in turn feeds an individual bushing tip 7. Referring to FIG. 1, the bushing 1, is provided with a conventional bushing ear 3 and associated connector 12, which is typically connected to a suitable transformer so that the bushing can be electrically heated and maintained at a temperature sufficient to keep the glass contained therein molten. This type of heating is understood by those skilled in the art and is described in detail in the book, "The Manufacturing Technology of Continuous Glass Fibers", by K. L. Lowenstein, Elsevier Publishing Co., 1973, Chapter V.

Figure 4:
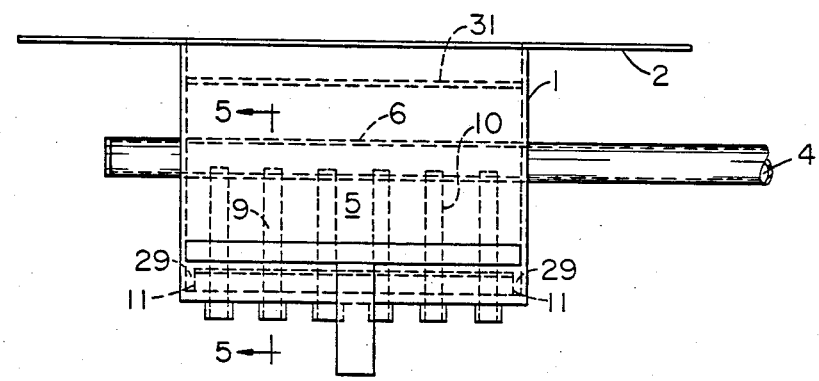
FIG. 4 is a side elevation of the bushing of FIG. 1 taken along lines 4—4 showing an air manifold, associated distributor tubes, and bushing tips.

Referring now to FIG. 4, there is shown a bushing 1 and its associated mounting flange 2 with a screen 31 positioned therein. Positioned in the bushing interior is a module, generally indicated by the number 5 and comprised of a header 6 and six gas feed tubes 10 attached thereto. The conduits 4 and 9 of the header 6 and gas feed tubes 10, respectively, are in fluid communication so that gases passed through header 6 can be distributed through each of the feed tubes 10. Bushing screen 31 is optional and may be eliminated if desired. In use, its function is to trap particulates of unmelted refractory or batch material to prevent clogging of bushing tips 7.

Figure 6:
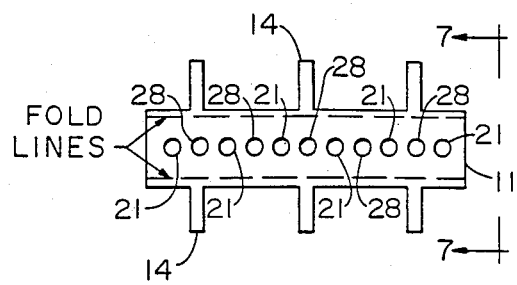
FIG. 6 is a plan view of the bracket assembly utilized to center and stabilize the bushing tips.
Figure 7:
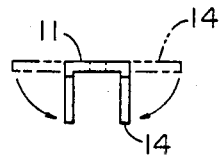
FIG. 7 is a cross-section of FIG. 6 taken along lines 7—7.

FIG. 6 shows a plan view of the bracket 11 shown in FIG. 5 as it is before the tabs 14 are folded to insert them into holes 24 of the bushing faceplate 13. Bracket 11, as shown, has 6 holes 21 in which the gas tubes 10 are inserted. The holes 28 positioned between holes 21 are optional and are utilized to improve glass flow to the tips located below the bracket. As shown in the drawing in FIG. 4, it will be noted that bracket 11 does not completely abut against the wall of bushing 1 and thus, there is an opening 29 on each end of bracket 11 and the wall of bushing 1 so that glass can flow freely under ends of the bracket 11 to the bushing tip plate 13. The tabs 14 are bent downwardly for insertion into appropriate holes 24 in the bushing faceplate 13. FIG. 7 shows the tabs 14 in their preferred bent position for insertion into the bushing faceplate 13. The bracket 11 is also in its operating position bent along the fold lines of FIG. 6 to provide elongated sides to impart strength to the upper surface of bracket 11.

Figure 3:
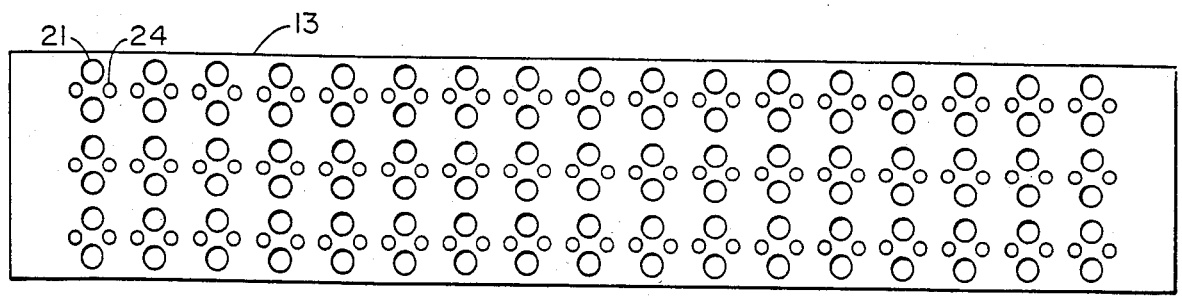
FIG. 3 is a plan view of the bushing taken along lines 3—3 of FIG. 1 showing the bushing tips and associated bracket mounting holes.

In FIG. 3, the faceplate of the bushing 1 is shown in plan view. The holes 24 are provided on either side of the holes 21 for the insertion of the tab members 14. The tabs 14 are of width and length such that when they are heated to melting temperature, such as by application of a welding torch thereto, there is sufficient metal in the tab members to completely fill the holes 24 with metal so that the button seal or anchor 15 formed thereby becomes a part of the bushing tip plate and is generally of the same depth or thickness as the tip plate.

In the operation of the apparatus as shown in FIGS. 1-7, a strand of hollow glass fibers is readily produced. Good concentricity of the central lumen of the fibers produced in the bushings shown herein is achieved for two basic reasons. In the first instance, the bushing tip 7 is firmly affixed to the bushing faceplate 13. The tube 10 through which the gases are introduced to provide the central lumen of the glass fibers as they are being formed is rigidly affixed to the bushing tip plate through the bracket member 11 and to the header 6 by weld 30 thereby forming a truss arrangement that prevents the tube from moving in any direction with respect to the tip plate itself, while reinforcing the tip plate to hinder distortion of it during use. Thus, any warping of the tip plate during operation will be slight and if it does occur, any consequent movement of the bushing tips carries with it an associated similar movement of the tube or conduit 10. Thus, gas introduced through the channel 9 of the gas tube 10 is always being introduced to the molten glass emanating from the annulus 16 in the bushing tip 7 at the same location relative thereto. The established lumen of the resulting fibers is thus readily maintained at its formed diameter as is the outside diameter of the fiber. The average K value obtained for the multifilament strands produced by the instant bushing is significantly above any heretofore possible and the production of solid or near solid filaments is held at low levels not heretofore experienced.

It has been found also that by introducing the air stream into the glass at the exit point of tip 7 and at a larger diameter than heretofore used, the characteristic bulging of the cone of the molten glass as shown in the prior art patents is avoided. Further, a nore stable attenuation process is achieved, and uniform concentric holes are provided in the glass fibers formed as the molten glass emanates from the novel bushing tip 7. This occurs because the diameters of the air stream and glass stream at the tip are in approximately the same proportion as the desired end product; a condition which is not found in prior art. Once again, the lumen is centrally located and is constantly in the same position regardless of whether or not the bushing tip plate has distorted because of the firm connection between the bracket member 11, the bushing faceplate 13, the tube 10 and its connection to header 6. Glass can flow freely into the area 25 above the bushing tips in all instances, where the tubes 10 are being held since the bracket member 11 is completely open in between the spaces between the tabs 14 as shown in FIGS. 6 and 7 and also through the holes 28 located in the top of the bracket member 11. The welds 22 between the tube 10 and the bracket member 11, the solid connection or button 15 formed by the side arm tabs 14 of the brackets 11 in the holes 24 provided in the tip plate for the tabs 14 and the weld 30 joining header 6 to tube 10 provide a truss attachment which significantly reduces the tendency of tip plate 13 to distort over time and use as is conventionally experienced with any fiber glass bushing constructed in accordance with the teachings of the prior art.

As will be readily understood, the bushing 1 is composed of any suitable bushing material utilized by the current state of the art. Typically, the bushings are constructed of precious metals, primarily Platinum and platinum-rhodium alloy. An 80 percent platinum-20 percent rhodium alloy by weight is the preferred bushing material. Recourse to the utilization of the zirconia stabilized platinum or alloys or any other grain stabilized precious metal alloy may also be had as well as recourse to ceramic coatings on the bushing and exterior supports where fiber glass compositions requiring heat in the bushing above 2300° F. are required.

Good hollow fiber filaments which can be readily gathered into strand form can be made utilizing the bushing construction shown and described herein to produce hollow glass fibers. Thus, in general, any glass fiber forming composition can be utilized so long as it is capable, upon melting, of forming a solid glass fiber. E-glass compositions have been employed to produce hollow fibers using this bushing as will be described hereinafter in more detail.

"E-glass" has generally the following composition:

| $SiO_2$ | 52–56% |
|---|---|
| $Al_2O_3$ | 12–16% |
| $B_2O_3$ | 9–11% |
| CaO | 16–19% |
| MgO | 3–6% | all percents being by weight of the composition. A more complete description is found in U.S. Pat. No. 2,334,961.

"621-glass" may also be used to produce the hollow fibers in the bushing of the instant invention. This glass is described in detail in U.S. Pat. No. 2,571,074, but generally has the following composition, all percents being by weight of the composition.

| $SiO_2$ | 52–56% |
|---|---|
| $Al_2O_3$ | 12–16% |
| $B_2O_3$ | 8–13% |
| CaO | 19–25% |

The bushing of the instant invention can also be used to produce filaments from boron-free, fluorine-free glass composition such as those described in U.S. Pat. Nos. 4,542,106; 3,846,626; 3,847,627; 3,876,481 and 4,026,715.

A particularly useful glass composition which contains no fluorine or boron is a glass composition containing 58 to 60 percent $SiO_2$, 11 to 13 percent $Al_2O_3$, 21 to 23 percent CaO, 2 to 4 percent MgO, and 1 to 1.8 percent $TiO_2$, all percentages being by weight of the glass composition. This glass composition may also contain up to 1 percent of an alkali metal oxide. By alkali metal oxide it is meant an oxide of metal of the group consisting of sodium, potassium, lithium. Hollow filaments can be produced in the bushing of the instant invention readily from this glass composition.

The bushing of the instant invention can also be used to produce hollow fibers from an S-glass composition to thereby provide the art with an extremely valuable high strength reinforced glass fiber of extremely light weight. An S-glass in general is a composition in which the silica content is between 60 and 70 percent by weight, the aluminum oxide content is between 20 and 30 percent by weight and the remaining ingredient is magnesium oxide in the weight percentage of 5 to 15 percent. All weight percentages given are on the basis of the weight of the glass.

Borosilicate glass filaments of hollow configuration may also be produced using the bushing of this invention. In general, the composition of a borosilicate glass suitable for preparing such hollow filaments contains $SiO_2$ 35 to 85 percent, alkali metal oxide at 1 to 15 percent, alkali and earth metal oxide 0 to 25, $Al_2O_3$ at 0 to 15 percent, $B_2O_3$ at 5 to 55 percent and 0 to 5 percent of metal oxides such as zirconium oxide, titanium oxide, ferric oxide and the like may also be present.

EXAMPLE

A series of runs were made on different days during regular working shifts on a direct melt furnace which contained molten glass of an E-glass type composition.

In general, the composition of the glasses produced typically contained 55.0% $SiO_2$; 14.0 percent $Al_2O_3$; 23.0 percent CaO; 0.5 percent magnesium oxide; 6.0 percent $B_2O_3$; 0.5 percent $F_2$; 1.0 percent $Na_2O$, all percentages being by weight of the glass fibers produced. These glasses were produced in a direct melt furnace having a rated capacity of 6 tons per day. Glass was fed from the furnace to a forehearth on which the bushing described herein and shown in FIGS. 1-7 was employed to produce hollow glass fibers. The bushing had 102 tips, each tip having a gas feed tube, the tips being in rows of 6 with each 6 gas feed tubes having a unitary header. The total number of headers used was seventeen (17). The seventeen (17) gas headers were fed air at a pressure of 2-3 inches of water. Variation in air pressure between each of the bushing tips 7 was typically less than 0.05 inches of water. Filaments emerging from the bushing tips 7 were gathered into strand form by passing them through a graphite gathering shoe after the filaments had passed over a rubber belt applicator which applied an aqueous lubricant to the filaments to assist in processing them. The strands of filaments were wound on a collet rotating on a winder which was pulling the glass strands from the bushing tip 7 at a rate of 13,000 feet per minute. The glass in the bushing was maintained at an approximate temperature of 2250° F. After the filaments were gathered on the collet to the desired weight the strand package was removed. Random packages were taken from different days of production and individual strands were then measured with a microscope to determine the internal diameter and the external diameter of the hollow fibers present in the strands collected on those packages. The fibers produced had average K values above 0.5 and consistently less than 10 percent of the individual fibers of the strands had K values below 0.5.

In general therefore, it can be readily appreciated that the strands of hollow filaments produced utilizing the novel bushing shown herein possess fibers having internal and external diameter ratios such that they provide the art with a product of superior reinforcement properties for resins and other matrices. Fibers can be made using the bushing herein described that are strong enough, with a small enough lumen, that they can be readily woven into cloth for utilization in membrane applications, dialysis applications and as hollow porcus glasses for use in biosupport and enzyme immobilizations and for many other uses. In the reinforcement area, they provide uniform reinforcement throughout the resin or other matrices that they are employed in, and provide an extremely high strength to weight ratio in such composites rendering them extremely useful in applications such as lightweight composites for aircraft, space vehicles and similar uses. In these applications, they not only provide adequate reinforcement but replace other materials which do not possess the unique qualities of glass fibers, i.e., better flammability properties, chemical inertness and low cost. Many lightweight composite reinforcements such as graphite are extremely expensive on a pound basis compared to the glass fibers.

The bushings of the invention lend themselves to any desired array of rows of tips using the multiunit gas distribution modules and the modular mounting brackets. The tips and their associated gas tubes are stable in the hot bushing environment, warpage of the bushing is minimized and has little adverse effect on overall tip geometry. The gas feed of the end of each tip further permits low gas pressures to be used to form the hollow fibers.

While the invention has been described with reference to certain specific examples and illustrative embodiments, it is not intended that it be limited thereby except insofar as appears in the accompanying claims.

We claim:

1. A fiber glass bushing for producing hollow glass fibers comprising a molten glass container having a bottom, a plurality of orifices in said bottom arranged in rows, a hollow tip projecting downwardly from each orifice, a row of tubes depending downwardly from a common gas distributor and in gas communication therewith and positioned inside of a row of tips so that each tip is provided with a concentrically located tube therein, a mounting bracket having a flat plate member spaced from the bushing bottom and provided with apertures along its length through which each of said hollow tubes pass, means to rigidly affix said tubes to said flat plate, at downwardly depending legs from said plate having their free ends fused to the bushing bottom, means to maintain the bushing at a desired temperature and means to pass a gas to said gas distributor tubes into the glass at the tip exit.

2. The bushing of claim 1, wherein the ends of said flat plate are spaced from the bushing walls at each end to provide glass circulation to said orifices.

3. The bushing of claims 1 or 2, wherein said flat plate is provided with openings therethrough adjacent to said apertures to permit molten glass to flow therethrough.

4. The bushing of claim 3, wherein said flat plate has six apertures and six hollow tubes welded thereto and said legs are six in number, three provided along the length of the plate on each side.

5. The bushing of claim 4, wherein the diameter of each gas tube inside of each said tip is sized to provide a ratio of that diameter to the diameter of the tip of at least 0.5.

6. The bushing of claim 5, wherein the diameter of each gas tube inside of each said tip is sized to provide a ratio of that diameter to the diameter of the tip of 0.5 to 0.9.

7. The bushing of claim 6, wherein the diameter of each gas tube inside of each said tip is sized to provide a ratio of that diameter to the diameter of the tip of 0.6 to 0.8.

8. The bushing of claim 7, wherein the ends of the tube and the tips are in the same horizontal plane.

9. The bushing of claim 2 wherein the diameter of each gas tube inside of each said tip is sized to provide a ratio of that diameter to the diameter of the tip of at least 0.5.

10. The bushing of claim 1 wherein the diameter of each gas tube inside of each said tip is sized to provide a ratio of that diameter to the diameter of the tip of 0.5 to 0.9.

11. The bushing of claim 1 wherein the diameter of each gas tube inside of each tip is sized to provide a ratio of that diameter to the diameter of the tip of 0.6 to 0.8.

12. The bushing of claim 1 wherein the ends of each tube and its associated tip are in the same horizontal plane.

13. The bushing of claim 9 wherein the ends of each tube and its associated tip are in the same horizontal plane.

14. The bushing of claim 10 wherein the ends of each tube and its associated tip are in the same horizontal plane.

15. The bushing of claim 11 wherein the ends of the tube and its associated tip are in the same horizontal plane.

16. The bushing of claim 2 wherein the ends of each tube and its associated tip are in the same horizontal plane.

17. The bushing of claim 1 wherein said flat plate is provided with openings therethrough adjacent to each aperture to permit molten glass to flow therethrough and wherein the ends of each tube and its associated tips are in the same horizontal plane.

18. The bushing of claim 2 wherein said flat plate is provided with openings therethrough adjacent to said aperture to permit molten glass to flow therethrough and wherein the ends of each tube and its associated tips are in the same horizontal plane.

19. The bushing of claim 4 wherein the ends of each tube and its associated tips are in the same horizontal plane.

* * * * *

UNITED STATES PATENT AND TRADEMARK OFFICE
CERTIFICATE OF CORRECTION

PATENT NO. : 4,735,642

DATED : April 5, 1988

INVENTOR(S) : Thomas H. Jensen et al

It is certified that error appears in the above-identified patent and that said Letters Patent is hereby corrected as shown below:

Column 8, line 36, 'tube' should be --tip--.

The following cited references were not listed in the References Cited section of the patent:

| Name | Patent No. |
|---|---|
| Schoenlaub | 2,334,961 |
| Tiede et al | 2,571,074 |
| Erickson et al | 3,847,626 |
| Erickson et al | 3,847,627 |
| Erickson et al | 3,876,481 |
| Erickson et al | 4,026,715 |
| Sproull | 4,542,106 |
| Stalego | 3,192,023 |
| Andrysiak | 3,743,494 |

The following patents, not cited in the patent application, are listed under the References Cited section

UNITED STATES PATENT AND TRADEMARK OFFICE
CERTIFICATE OF CORRECTION

PATENT NO. : 4,735,642

Page 2 of 2

DATED : April 5, 1988

INVENTOR(S) : Thomas H. Jensen et al.

It is certified that error appears in the above-identified patent and that said Letters Patent is hereby corrected as shown below:

of the patent, and should be deleted.

"3,257,183  6/1966  Slayter et al---------65/6
 3,526,571  9/1970  Ogata-----------------425/DIG. 217".

Signed and Sealed this

Twenty-second Day of November, 1988

*Attest:*

DONALD J. QUIGG

*Attesting Officer*   *Commissioner of Patents and Trademarks*